(12) United States Patent
Lee

(10) Patent No.: US 7,896,068 B2
(45) Date of Patent: *Mar. 1, 2011

(54) ACTIVATION MECHANISM APPLICABLE FOR OILFIELD CHEMICALS PRODUCTS

(75) Inventor: Jesse Lee, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 149 days.

This patent is subject to a terminal disclaimer.

(21) Appl. No.: 11/958,867

(22) Filed: Dec. 18, 2007

(65) Prior Publication Data

US 2008/0149335 A1 Jun. 26, 2008

(30) Foreign Application Priority Data

Dec. 21, 2006 (EP) ..................... 06292018

(51) Int. Cl.
*E21B 33/138* (2006.01)

(52) U.S. Cl. .......... 166/248; 166/60; 166/66.5; 166/288; 166/302

(58) Field of Classification Search ................ None
See application file for complete search history.

(56) References Cited

U.S. PATENT DOCUMENTS 5,970,787 A * 10/1999 Wignall ..................... 73/152.54

FOREIGN PATENT DOCUMENTS

WO WO 03 063548 7/2003

* cited by examiner

*Primary Examiner* — Zakiya W. Bates
(74) *Attorney, Agent, or Firm* — David Cate; Robin Nava; Matt Abrell

(57) ABSTRACT

A product suitable for use in an oilfield environment is described, the product comprising: a first component; a first layer surrounding the first component, wherein the first layer is made of a protective material able to protect the first component from surrounding oilfield environment; a first susceptor, wherein the first susceptor is able to interacts with a magnetic field to generate heat.

17 Claims, 6 Drawing Sheets

ACTIVATION MECHANISM APPLICABLE FOR OILFIELD CHEMICALS PRODUCTS

RELATED APPLICATION DATA

This application claims the benefit of EP Patent Application 06292018.6 filed Dec. 21, 2006 entitled, "NOVEL CONTROL RELEASE MECHANISM FOR OILFIELD CHEMICAL PRODUCTS"

FIELD OF THE INVENTION

The present invention broadly relates to well cementing. More particularly the invention relates to a composition useful to encapsulate other composition and to release it easily. The composition of the invention applies especially for wells from a subterranean reservoir, such as for instance an oil and gas reservoir or a water reservoir.

DESCRIPTION OF THE PRIOR ART

During a hydrocarbon well drilling operation and after a hydrocarbon well has been drilled, various fluid injecting operations are generally carried out. The fluid injecting operations serves various purposes, for example delivering a chemical mixture into a fluid present in the borehole for consolidation purpose or fracturing purpose, or delivering a chemical mixture into a cement slurry for borehole cementing operation.

Subsequently, cementing operations are generally undertaken to seal the annulus (i.e. the space between the well-bore and the casing where fluid can flow). A first application is primary cementing which purpose is to achieve hydraulic isolation around the casing. Other applications are remedial cementing which purposes are to stabilize the well-bore, to seal a lost circulation zone, to set a plug in an existing well or to plug a well so that it may be abandoned. The cement may be pumped into the well casing through a casing shoe near the bottom of the bore-hole or a cementing valve installed in the casing so that the cement is positioned in the desired zone.

Cementing engineers prepare the cementing operations by determining the volume and physical properties of cement slurry and other fluids pumped before and after the cement slurry. In many situations, chemical additives are mixed with the cement slurry in order to modify the characteristics of the slurry or set cement. Cement additives may be broadly categorized as accelerators (i.e. for reducing the time required for the set cement to develop sufficient compressive strength to enable further operations to be carried out), retarders (i.e. for increasing the thickening time of cement slurries to enable proper placement), dispersants (i.e. for reducing the cement slurry viscosity to improve fluid-flow characteristics), extenders (i.e. for decreasing the density or increasing the yield of a cement slurry), weighting agents (i.e. for increasing or lightening the slurry weight), fluid-loss or lost-circulation additives (i.e. for controlling the loss of fluid to the formation through filtration) and special additives designed for specific operating conditions.

Because cement additives have an effect as soon as they are mixed with the cement slurry, it is important that cement additives are injected in the cement slurry at the proper time and at the desired location in the well-bore. However, as the cement is pumped to the bottom hole of the wellbore first before being allowed to set and this pumping usually takes time; there is a need to find a way to add chemicals directly in the well when needed. Various solutions were proposed: use a downhole apparatus to directly release the chemicals when needed, use a retardation process of the chemicals so that it becomes active only downhole, use an encapsulation of the chemicals and breaks this encapsulation downhole.

The proposed invention finds a new approach to encapsulate the chemicals. Also, it is noted that this technique does not only apply to cementing application but to all type of chemical release for oilfield application.

SUMMARY OF THE INVENTION

The present invention disclose a product suitable for use in an oilfield environment comprising: a first component; a first layer surrounding said first component, wherein said first layer is made of a protective material able to protect the first component from surrounding oilfield environment; a first susceptor, wherein said first susceptor is able to interacts with a magnetic field to generate heat.

Preferably, the first susceptor is located within the first layer. This embodiment procures an easy way to create the protective shell. Alternatively, the product further comprises a second layer surrounding the first component and surrounded by said first layer.

Preferably, the first susceptor is an electrically non-conductive susceptor, and the product further comprises a second susceptor being an electrically conductive susceptor. In a first example of realization, the first susceptor comprises iron oxide particles, hexagonal ferrite particles, or magnetically soft ferrite particles. In a second example of realization, the second susceptor comprises elemental ferromagnetic particles or ferromagnetic alloys. In another example, the second susceptor comprises nickel, iron, and cobalt and combinations thereof and of their alloys.

Preferably, the first component is in liquid state. And/or the first component is anyone taken in the list accelerators, retarders, dispersants, extenders, weighting agents, fluid-loss and lost-circulation additives.

In another embodiment, the product further comprises a second component surrounded by the first layer along with the first component. Preferably, the first component and the second component are further separated through an internal wall inside the first layer and/or inside the second layer.

In another aspect of the invention a method to treat a wellbore including a zone is disclosed, the method comprising the steps of: pumping a product as disclosed above into said wellbore; placing said product in the vicinity of said zone; and applying an alternating magnetic field on said product.

In one example, the step of applying an alternating magnetic field on said product is made just before said product is placed in the vicinity of said zone. In a second example, the step of applying an alternating magnetic field on said product is made just after said product is placed in the vicinity of said zone.

In a third example, the alternating magnetic field is applied with a first retrievable tool lowered into the wellbore. An in a fourth example, the alternating magnetic field is applied with a second permanent tool embedded in a casing or a tubing lowered into the wellbore.

Preferably, the method further comprises the step of ceasing the step of applying an alternating magnetic field on said product when said first layer has broken. And/or the alternating magnetic field is of frequency between 2 MHz and 30 MHz.

BRIEF DESCRIPTION OF THE DRAWINGS

Further embodiments of the present invention can be understood with the appended drawings.

DETAILED DESCRIPTION

Figure 1A:
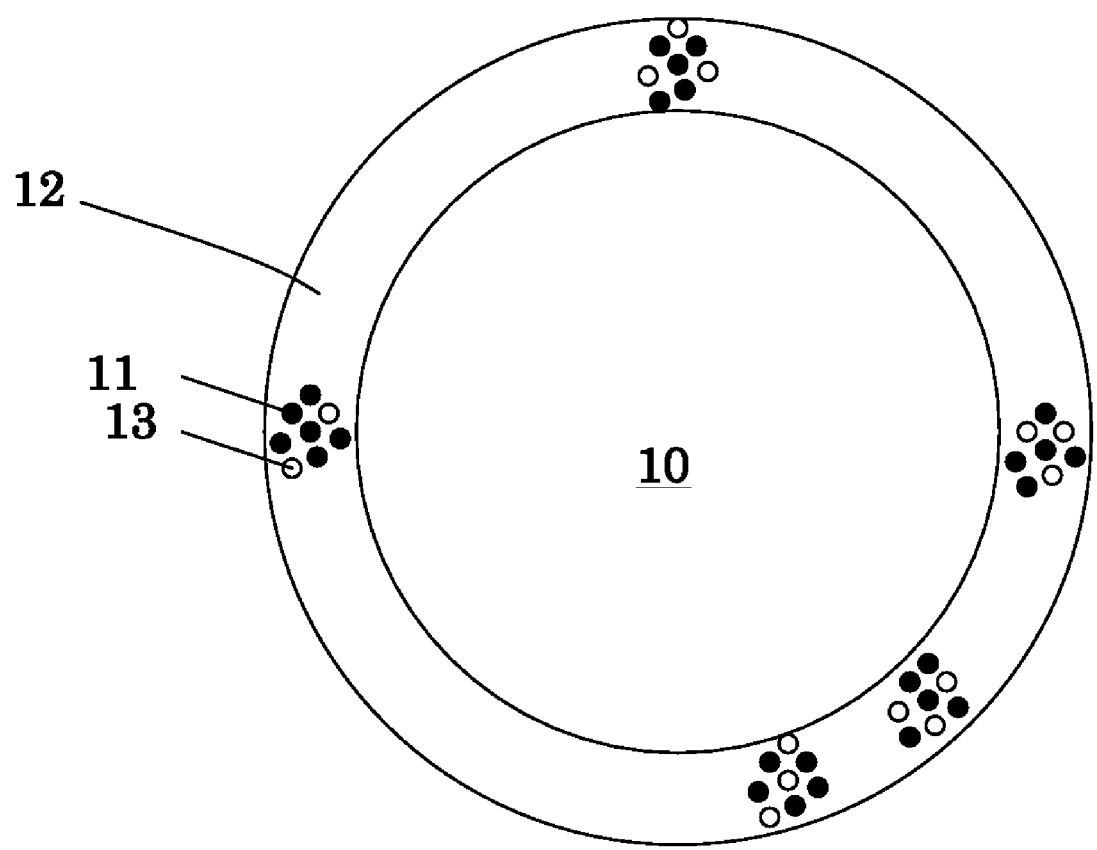
FIG. 1A shows the product according to the invention in a first embodiment before activation.

The products of the present invention are designed to enclose and/or protect their contents until an intended site of delivery or conditions of delivery are encountered, therefore they can be called delivery capsules. In this way, they can be used as a means to contain potentially hazardous or difficult-to-handle components and to deliver such components to a well bore or a surrounding subterranean formation to perform a desired function. The delivery capsules of the present invention also may be used with any downhole fluids where it is desirable to have components separated until they are released so that they may react with each other and/or the formation. Examples of such downhole fluids include inter alia drilling, completion and workover fluids. FIG. 1A shows an example of the delivery capsule of the present invention for handling a first component 10.

Figure 3:
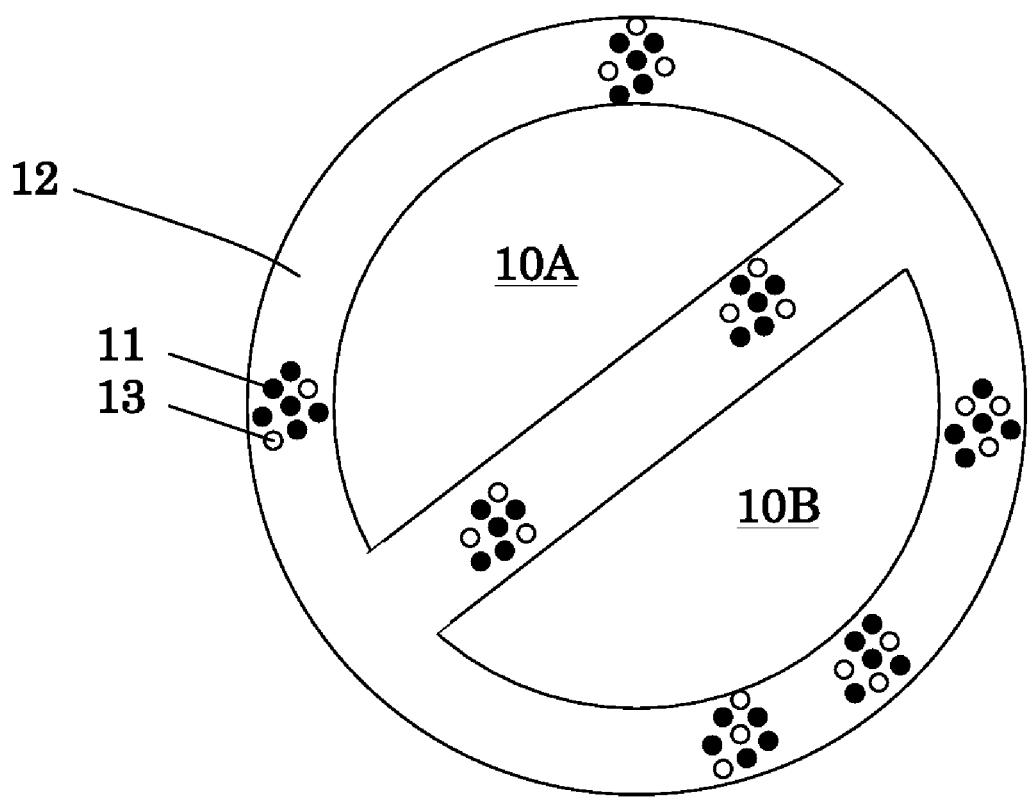
FIG. 3 shows the product according to the invention in a second embodiment.
Figure 4:
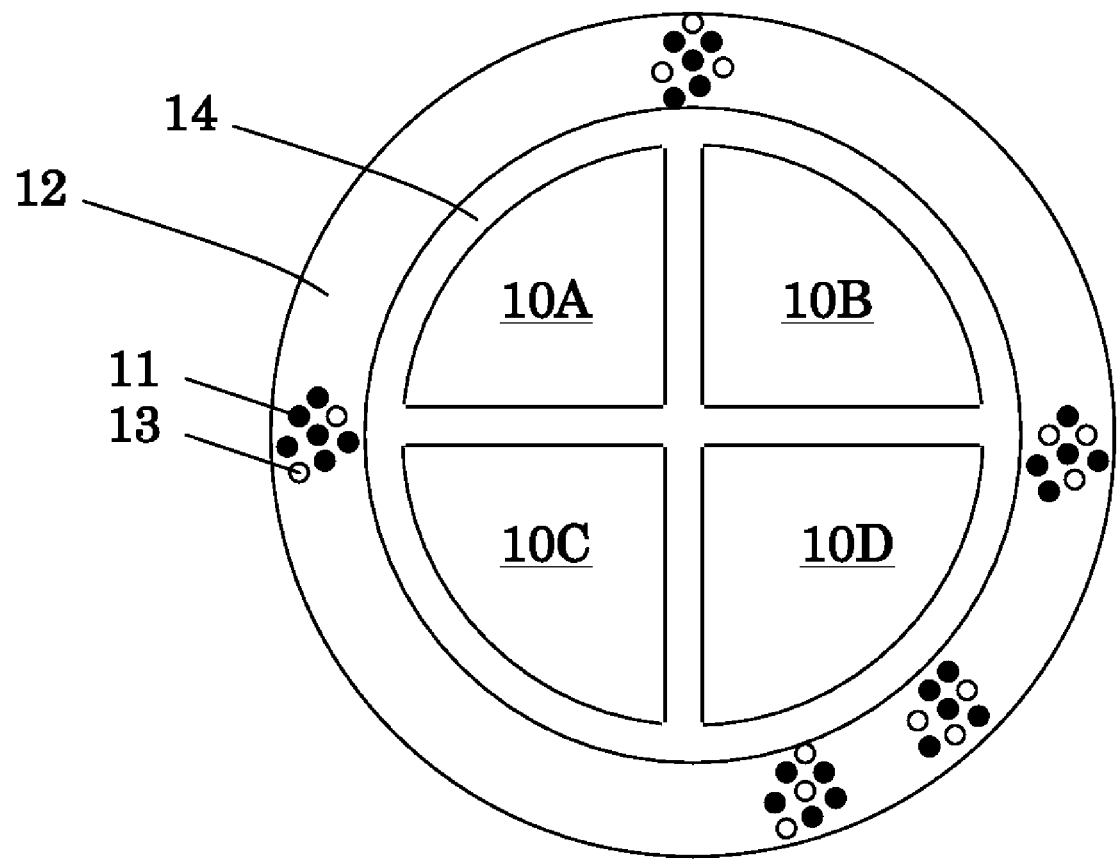
FIG. 4 shows the product according to the invention in another embodiment.

In most embodiments, the delivery capsules of the present invention may be spherical, ovoid or cylindrical in shape. In a first embodiment, the product is made of a capsule comprising only one chamber (FIGS. 1 and 2). In a first example of this first embodiment, the delivery capsule is made of only one protective wall called a first layer 12 (FIG. 1A). In a second embodiment, the capsule comprises at least two chambers (FIGS. 3 and 4) containing a first and a second chemical component. In certain embodiments the two chambers within the delivery capsule preferably are separated by an impermeable dividing wall which among other things prevents mixing of the chemical components contained in each chamber. In preferred embodiments, the dividing wall should not allow one chemical component in one chamber to mix with a second chemical component in the second chamber. If desired these two chambers may be divided into subchambers, e.g., each chamber may be divided into at least one other subchamber (FIG. 4 showing a capsule with four chambers). Such embodiments may be useful wherein it is desirable to provide or facilitate the delivery of more than two chemical components to the well bore or the subterranean formation surrounding the well bore.

In the second embodiment, the first chemical component and the second chemical component may be completely separated by the dividing wall until delivery or release of the chemicals into the subterranean formation. The first chamber and the second chamber may be of similar size and shape or of different size and; shape, e.g., when different proportions of the first chemical component and the second chemical component are needed for the desired application. Typically, the delivery capsules of the present invention range from about 3 mm to about 20 mm in size, but other sizes may also be suitable, depending on the chemical components to be supplied and the purpose of using the delivery capsules. One of ordinary skill in the art, with the benefit of these disclosures will recognize the appropriate embodiment(s) of the capsules of the present invention that are suitable for a chosen application.

Each chamber in a delivery capsule may contain a chemical component to be carried downhole for a chosen application. In certain embodiments, the chambers may contain different chemical components that may perform different functions once released. For instance, the capsule could contain both a cement-expanding agent and a cement accelerator for release in a well bore cement composition. In other embodiments, each chamber may contain a different chemical that, when released, combines to perform a desired function downhole.

For example, in an embodiment, the first chemical component in the first chamber of a delivery capsule of the present invention and the second chemical component in the second chamber of the same delivery capsule, when released, react to form an acid downhole that can be used, for example, to acidize a chosen portion of the subterranean formation. For instance, in an example of this embodiment, the first chemical component comprises a formaldehyde solution and the second chemical component comprises an ammonium salt. When the formaldehyde solution and the ammonium salt are released upon the degradation of the capsule, they react with one another to form an acid. The resultant acid may be used, inter alia, to acidize a portion of the subterranean formation surrounding the well bore. In another embodiment, a first chemical component contained in a first chamber of a delivery capsule of the present invention and a second chemical component in a second chamber of the same delivery capsule, when released, react to form a gas. For instance, the first chemical component may comprise aluminum powder and the second chemical component may comprise a liquid caustic such as sodium hydroxide. This embodiment may be useful in applications wherein it is desirable to impart a gas to a fluid or composition. One example is the foaming of a cement composition to reduce its density.

The chemical components contained within the chambers of the delivery capsules of the present invention may be liquids, solids (e.g., powders), and/or gases, as is necessary for a chosen application. In most embodiments, the different chambers of the delivery capsules will contain different materials, possibly in different forms, e.g., liquid, solid, slurry, etc.

Figure 1B:
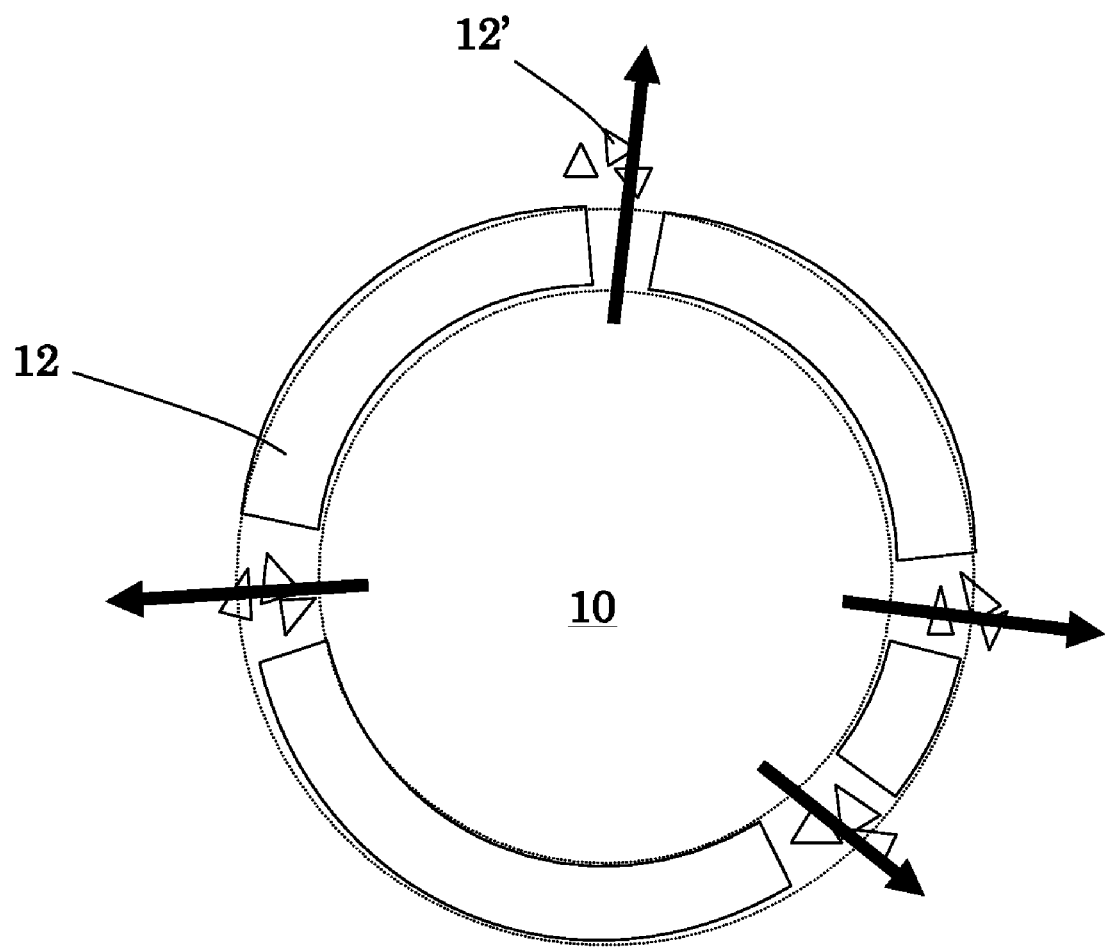
FIG. 1B shows the product according to the invention in a first embodiment after activation and in its broken state.

The delivery capsules of the present invention are preferably made from a degradable material that degrades when subjected to downhole stimulus (or activation) so as to release the chemical components that are contained in the chamber(s) of the delivery capsules into the well bore. For this reason, the degradable material contains at least one susceptor 11 (FIGS. 1 to 4) and preferably several susceptors. So, the present invention uses the combination of an induction heating means and susceptors for triggering the break of the degradable material (FIGS. 1B and 2B).

Therefore, according to the invention a combination of at least one susceptor and high frequency alternating magnetic fields is used, susceptor generating heat thanks to the alternating magnetic fields so that heat be sufficient to begin a modification of the shell of the product (i.e. the capsule made of the degradable material). The modification can be the degradation or decomposition in itself, a transformation of composition or state (melting) of the delivery capsule, a weakening of the delivery capsule creating a further break, or a break of the delivery capsule. Both ferromagnetism in a ferromagnetic material and ferrimagnetism in a non-conductive ferromagnetic material disappears at the Curie temperature as thermal oscillations overcome the orientation due to exchange interaction, resulting in a random grouping of the atomic particles. When a non-conductive ferrimagnetic material is placed in an electromagnetic field, the hysteresis losses in the material cause its temperature to rise, eventually reaching its Curie temperature. Upon reaching its Curie temperature, the material crystal lattice undergoes a dimensional change, causing a reversible loss of magnetic dipoles. Once the magnetic dipoles are lost, the ferrimagnetic properties cease, thus halting further heating.

The delivery capsule made of the first layer coating is made of any type of protective material able to protect the chemical component(s) of the capsule from the surrounding downhole fluids.

Preferably, the invention involves the use of at least two different susceptors (11 and 13 in FIGS. 1 to 4) within the delivery capsule that heat, under an alternating magnetic field. Thanks to this combination of two susceptors, they heat at an unexpectedly quick rate. More specifically, the invention provides heating agents that heat at average heating rates greater than 300° C./s (575° F./s) to activate initiator that will initiate a polymerization chain reaction such that a solid/gel polymer is created. Patent application WO03063548 uses a combination of a first non-conductive susceptor and a second electrically conductive susceptor, benefits of this combination seems to be the rapid heating phenomenon. Also, the addition of the second susceptor type helps to focus the magnetic field on the non-conductive susceptors, enabling the temperature to continue to rise rapidly. As described in the patent application WO03063548, among the important parameters in the process of using two types of susceptors are the following: size and shape of the ferrimagnetic hysteresis loop, susceptor loading, alternate heating mechanisms, particle shape. The term "susceptor" as used herein refers to a material that interacts with a magnetic field to generate a response, e.g., eddy currents and/or hysteretic losses. The method and apparatus of the present invention are based on the use of dual "susceptors" in oilfield applications that can be used to heat monomers and associated initiator such that a polymerization chain reaction begins and said monomers create a polymer able to form a solid/gel mass. The susceptors are further described below.

Preferably, in the product, the susceptors comprise (a) at least one plurality of electrically non-conductive susceptors and (b) at least one plurality of electrically conductive susceptors. The method and product of the present invention utilize the fact that magnetic induction heating occurs in magnetic or electrically conductive materials when they are subject to an applied alternating magnetic field. The present invention takes advantage of the heating that occurs in the combination of susceptors described herein. When a current-carrying body, or coil, is placed near the susceptors of the present invention, the magnetic field caused by the current in the coil induces a current in the susceptors. In the electrically conductive magnetic susceptors, heating occurs by both eddy current and hysteresis losses. It is eddy currents losses that dominate. In the non-conducting magnetic materials, heating occurs by hysteresis losses. In this later case, the amount of energy available for heating is proportional to the area of flux vs. field intensity hysteresis curve (B vs. H) and frequency of the alternating field. This mechanism exists as long as the temperature is kept below the Curie point ($T_c$) of the material. At the Curie point, the originally magnetic material becomes non-ferromagnetic. Thus, at its $T_c$ heating of the magnetic material ceases. The combination of these conductive and non-conductive susceptors as described herein produces a rapid rate of heating, e.g., greater than 300° C./s.

The electrically non-conductive susceptors are preferably micron-sized ferrimagnetic particles. Examples of the electrically non-conductive particles include, but are not limited to, iron oxides, hexagonal ferrites, or magnetically soft ferrites. Examples of hexagonal ferrites include compounds that have the composition SrF, $Me_a$-2W, $Me_a$-2Y, and $Me_a$-2Z, wherein 2W is $BaO:2Me_3O:8Fe_2O_3$, 2Y is $2(BaO:Me_3O:3Fe_2O_3)$, and 2Z is $3BaO:2Me_3O:12Fe_2O_3$, and wherein $Me_a$ is a divalent cation. Examples of the magnetically soft ferrite particles have the composition $1MebO:1Fe_2O_3$, where $Me_bO$ is a transition metal oxide. $Me_a$ comprises Mg, Co, Mn or Zn and $Me_b$ comprises Ni, Co, Mn, or Zn. In preferred embodiments the electrically non-conductive particles, e.g., ferrimagnetic particles, have a size of from about 1 µm to about 50 µm. The electrically non conductive particles comprises from about $20^{w/o}$ ($10^{v/o}$) to about $58^{w/o}$ ($30^{v/o}$) of the composition. Examples of useful hexagonal ferrites include those shown in Table 1:

TABLE 1

| Me-2W | Me-2Y | Me-2Z |
|---|---|---|
| $Co_2Ba_1Fe_{16}O_{26}$ | $Co_2Ba_2Fe_{12}O_{22}$ | $Co_2Ba_3Fe_{24}O_{41}$ |
| $Co_1Zn_1Ba_1Fe_{16}O_{26}$ | $Co_1Zn_1Ba_2Fe_{12}O_{22}$ | $Co_1Zn_1Ba_3Fe_{24}O_{41}$ |
| $Mg_2Ba_1Fe_{16}O_{26}$ | $Mg_2Ba_2Fe_{12}O_{22}$ | $Mg_2Ba_3Fe_{24}O_{41}$ |
| $Mg_1Zn_1Ba_1Fe_{16}O_{26}$ | $Mg_1Zn_1Ba_2Fe_{12}O_{22}$ | $Mg_1Zn_1Ba_3Fe_{24}O_{41}$ |
| $Mn_2Ba_1Fe_{16}O_{26}$ | $Mn_2Ba_2Fe_{12}O_{22}$ | $Mn_2Ba_3Fe_{24}O_{41}$ |
| $Mn_1Zn_1Ba_1Fe_{16}O_{26}$ | $Mn_1Zn_1Ba_2Fe_{12}O_{22}$ | $Mn_1Zn_1Ba_3Fe_{24}O_{41}$ |

See L. L. Hench and J. K. West: "Principles of Electronic Ceramics" (John Wiley & Sons 1990) pp. 321-325. The ferromagnetic hexagonal ferrites are also known as hexagonal ferrimagnetic oxides. Examples of preferred ferrimagnetic hexagonal ferrites include SrF, Co-2Y and Mg-2Y. A range of Curie temperatures is preferred for the susceptors to be effective in activating different types of initiators.

Other non-conducting particles comprise magnetically soft ferrite particles having the structure $1MeO:1Fe_2O_3$, where MeO is a transition metal oxide. Examples of Me include Ni, Co, Mn, and Zn. Preferred particles include: (Mn,ZnO)$Fe_2O_3$ and (Ni,ZnO)$Fe_2O_3$, also referred to as MnZn and NiZn ferrites, respectively. Even though "soft" ferrites have a narrower hysteresis loop than the "hard" ferrites, efficient heating with "soft" ferrites is achievable under proper processing conditions, e.g., power level and frequency, that utilize the total hysteresis loop area.

The electrically conductive susceptors are preferably ferromagnetic particles and intrinsically conductive polymer (ICP) particles. The electrically conductive ferromagnetic particles can be elemental ferromagnetic particles or ferromagnetic alloys. Examples of electrically conductive particles comprise; nickel iron and cobalt and combinations thereof and of their alloys. Preferred; ferromagnetic particles have a size of from about 5 µm to about 100 µm, more preferably from about 10 µm to about 50 µm. Intrinsically conductive polymers (ICPs) are organic polymers that conduct electric currents while retaining the other typical properties commonly associated with a conventional polymer. ICPs are different from so-called conducting polymers that are merely a physical mixture of a non-conducting polymer with a conducting material such as metal or carbon powder. In addition to the generation of heat by hysteresis losses in the ferrimagnetic particles eddy current losses within the electrically conductive polymer contribute additional heating to enhance the rate of heating of the heating agent. Since ICPs tend to lose their electrical conductivity at temperatures above about 200° C. heating agents utilizing ICPs are preferably used in applications in which the maximum process welding temperature is below 200° C. Examples of ICPs include polyaniline, polypyrrole, polythiophene, polyethylenedioxythiophene, and poly (p-phenylene vinylene). The electrically conductive particles preferably have a size of from about 5 μm to about 100 μm, more preferably, from about 10 μm to about 50 μm and comprise from about $10^{w/o}$ ($5^{v/o}$) to about $29^{w/o}$ ($15^{v/o}$) of the composition.

Examples of dual susceptor formulations include Strontium Ferrite/Flake Nickel; Mn—Zn Ferrite/Flake 97Ni-3Al; Mn—Zn Ferrite/Iron.

The product and method of the present invention enable the use of standard coil constructions and the use of available induction generators. The coil current used in the present invention ranges from about 50 to about 150 A. The method of the present invention produces rapid heating rates at lower coil currents. According to the type of susceptors used, the frequency and the strength of the magnetic field are adjusted so it can be used to induce heating for activation of the initiator. Preferably the useful frequency range is from about 2 MHz to about 30 MHz and the preferred power ranges from about 1 kW to about 7.5 kW. Where the desired temperature is higher the frequency and power will be at the higher end of the range, e.g., from about 10 MHz to about 15 MHz.

Depending on the susceptors used, the field generated by the induction coil influences the heating patterns of the susceptors and the field is a function of the coil geometry. Examples of coil design include solenoid, pancake, conical and Helmholtz. While these coil types are among those commonly used by industry, certain embodiments of invention may require specialized coils. For example, in certain embodiments solenoid coils are preferred because solenoid coil geometry produces a very strong magnetic field. In other embodiments, pancake coils are used. Pancake coils have been found to produce a non-uniform field with its maximum at the center. Magnetic field strength increases with increasing number of coil turns, increasing coil current and decreasing coil-work piece separation. The factors can be readily manipulated by one of ordinary skill in the art to select combinations of these factors to obtain the desired magnetic field strength. Solenoid coil geometry produces the strongest field of all the possible geometries. Pancake coils are most common in one-sided heating applications. Changing the coil parameters (e.g., spacing between turns or the number of turns) can change the field values, but the pattern is generally the same.

One also needs to take the coil design (for induction heating) into consideration depending on the various types of methods of use. So, a solenoid coil can be used to trigger the release of material flow through it and a pancake coil design can be used to trigger the release of chemicals above or in front of it.

Figure 2A:
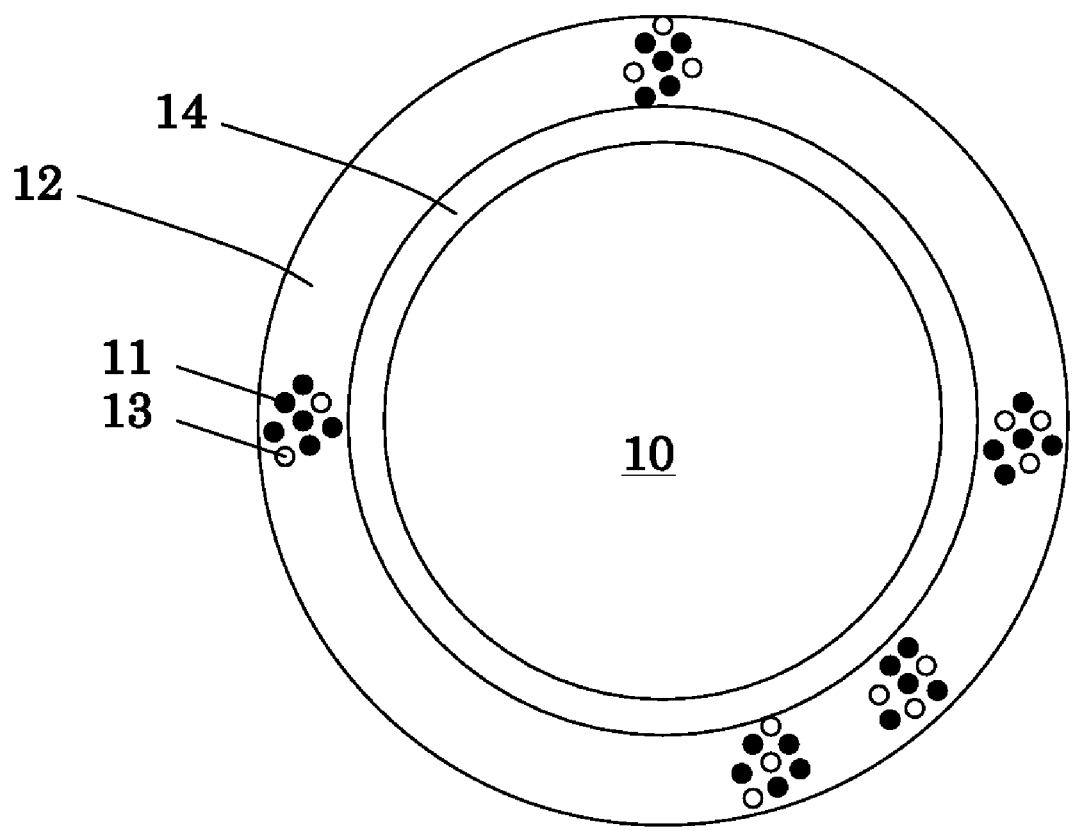
FIG. 2A shows another example of the product according to the invention in a first embodiment before activation.
Figure 2B:
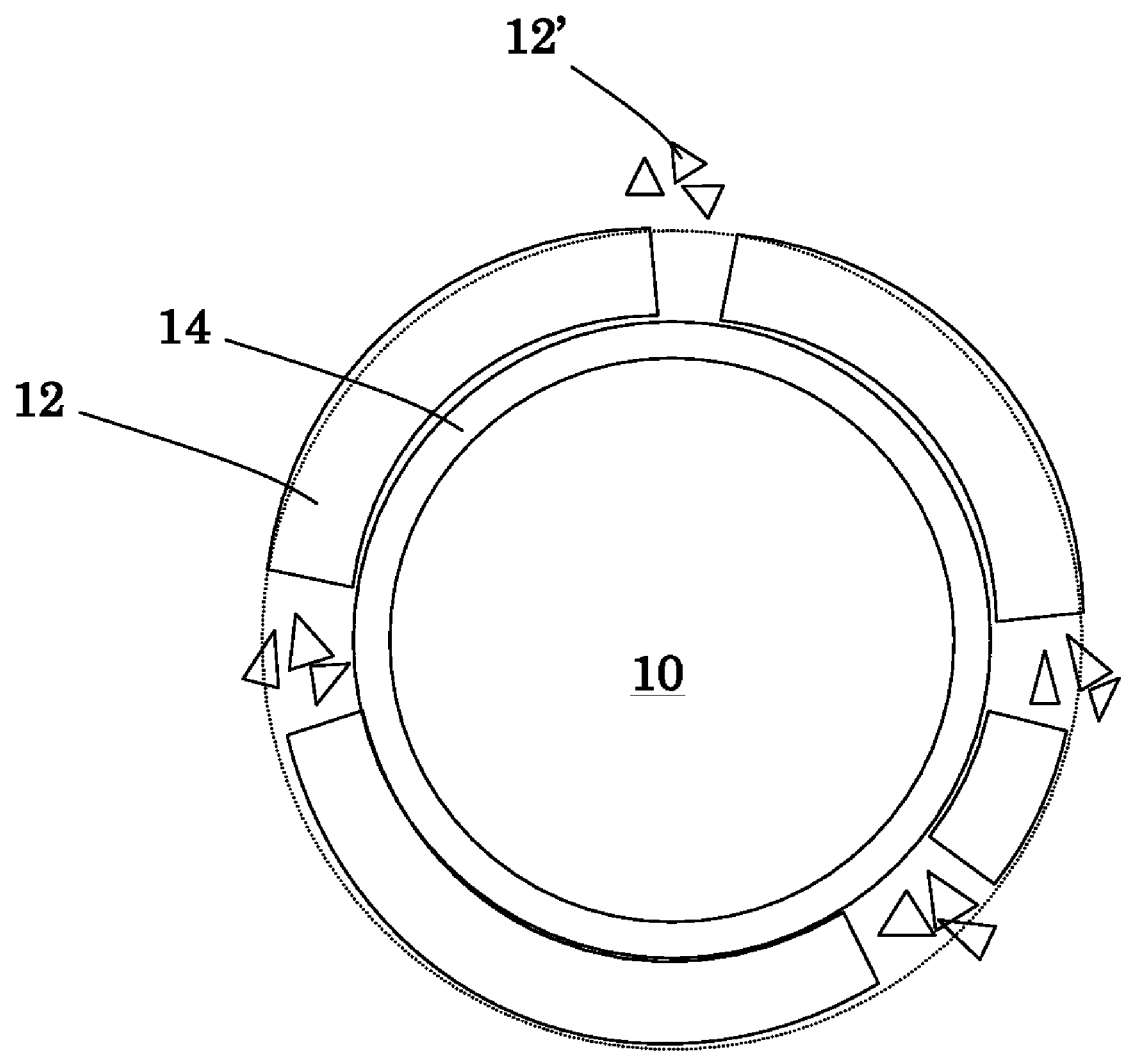
FIG. 2B shows another example of the product according to the invention in a first embodiment after activation and in its broken state.

In a second example of the first embodiment of the product, the delivery capsule is made of two protective walls called a first layer 12 and a second layer 14 (FIG. 2A). The second layer surrounds the first component and is surrounded by the first layer. The first layer is of the type described above, whereas the second layer is either also of the type described above or of the type degradable material as described below. Aim of this combination of two different types of coating ensure a controlled release of the chemical components in two steps: a first step by activating the susceptor through the method described above to break the first layer for releasing delivery capsule with second layer and a second step allowing the second layer to be degraded for finally releasing the chemical component(s). This combination is quite useful when double release is needed.

The second layer may preferably include degradable materials as degradable polymers. Such degradable materials may be capable of undergoing an irreversible degradation downhole. The term "irreversible" as used herein means that the degradable material, once degraded downhole, should not recrystallize or reconsolidate while downhole, e.g., the degradable material should degrade in situ but should not recrystallize or reconsolidate in situ. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result, inter alia, of a chemical or thermal reaction or a reaction induced by radiation. We should be mindful that the degradability of a polymer depends at least in part on its backbone structure. For instance, the presence of hydrolyzable and/or oxidizable linkages in the backbone often yields a material that will degrade as described herein. The physical properties of degradable polymers depend on several factors such as the composition of the repeat units, flexibility of the chain, presence of polar groups, molecular mass, degree of branching, crystallinity, orientation, etc. For example, short-chain branches reduce the degree of crystallinity of polymers while long-chain branches lower the melt viscosity and impart, inter alia, elongational viscosity with tension-stiffening behavior. The properties of the material utilized can be further tailored by blending, and copolymerizing it with another polymer, or by a change in the macromolecular architecture (e.g. hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about With of the rate of racemic poly(lactide) at a pH of 7.4 at 55° C.

Suitable examples of degradable materials that may be used in accordance with the present invention include, but are not limited to, those described in the publication of Avarices in Polymer Science, Vol. 157, entitled "Degradable Aliphatic Polyesters" and edited by A. C. Albertsson, pages 1-138. Examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerizations, and any other suitable process may prepare such suitable polymers. Specific examples of suitable degradable materials include polysaccharides such as dextrans or celluloses; chitins, chitosans; liquid esters (e.g., triethyl citrate); proteins (e.g. gelatin); aliphatic polyesters; poly(lactides); poly(glycolides); poly(s-caprolactones); poly(hydroxybutyrates); poly(anhydrides); aliphatic poly(carbonates); ortho esters, poly(orthoesters); poly(amino acids); poly(ethylene oxides); and poly(phosphazenes). Other suitable materials include heat-sealable materials, other thermoplastic materials, or those that may be dissolved with an appropriate solvent. Examples include hydroxy propyl methylcellulose, pectin, polyethylene oxide, polyvinyl alcohol, alginate, polycaprolactone, gelatinised starch-based materials, and the like. In one embodiment, hydroxy propyl methylcellulose MC) is used.

In alternative embodiments, the delivery capsules may be coated with coatings that, inter alla, may facilitate the dispersion of the delivery capsules in a fluid or composition or, in some way, alter the solubility of the delivery capsules in the subterranean environment. Suitable coatings, include, but are not limited to, gum arabics, pectins, and alginates. Such coatings may be used to impart a degree of resistance, if desired, to the delivery capsule's solubility. For instance, gum arable, pectin, and alginate all have a slight retarding effect on HPMC solubility; the extent of the effect may vary, depending on the thickness of the coating. This may be desirable when a delay period is beneficial before the chemical components contained within the delivery capsules are released.

Also, both pectin and alginate may be cross-linked to provide a degree of pH resistance to the delivery capsules so that they will not degrade so as to release their contained chemical components until a desired pH is encountered.

In choosing the appropriate degradable material, one should consider the degradation products that will result. These degradation products should not adversely affect other operations or components The choice of degradable material also can depend, at least in part, on the conditions of the well, e.g. wellbore temperature. For instance, lactides have been found to be suitable for lower temperature wells, including those within the range of 15° C. to 65° C., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications Also, in some embodiments, it is desirable for the degradable material to degrade slowly over time as opposed to instantaneously.

In alternative embodiments, different degradable materials (in terms of thickness and/or composition and/or coatings) may be used to define the different chambers in a capsule of different capsules within a composition. For instance, using a thicker material to define one chamber in a capsule may result in a slightly delayed release of the chemical component within that chamber. In this way, it is possible to provide for the release of different chemical components in the chambers under different conditions, for instance, different temperatures or at different pHs. In one embodiment, such different degradable materials in a capsule may be used to facilitate the delivery of a first chemical component to one portion of the well bore and the delivery of a second chemical component to a second portion of the well bore.

If the application in which the degradable delivery capsule will be used does not contain a component that will enable the degradable material to degrade, e.g., in a dry gas hole, then in alternative embodiments of the present invention, the degradable material can be mixed with inorganic or organic compound. In preferred alternative embodiments, the inorganic or organic compound is hydrated. Examples of the hydrated organic or inorganic solid compounds that can be utilized, include, but are not limited to, hydrates of organic acids I or their salts such as sodium acetate trihydrate, L-tartaric acid disodium salt dihydrate, sodium citrate dihydrate, hydrates of inorganic acids, or their salts such as sodium tetraborate decahydrate, sodium hydrogen phosphate heptahydrate, sodium phosphate dodecahydrate, amylose, starch-based hydrophilic polymers, and cellulose-based hydrophilic polymers. Of these, sodium acetate trihydrate is preferred. The lactide units of the aliphatic polyester and the releasable water of the organic or inorganic solid compound utilized are preferably present in the mixture in equal molar amounts. The degradable material is then in a sense self-degradable, in that the degradable should at least partially degrade in the releasable water provided by the hydrated organic or inorganic compound, which dehydrates over time when heated in the subterranean zone.

According to the invention, products described herewith can be used in various methods in oilfield applications. Examples are: in primary cementing technique, the product can be used to release cement accelerator at the bottom of the casing to significantly reduce the wait on cement time and to minimize setting in the pipe; in curing loss circulation and spotting fluid loss pills, the product can be used to release the crosslinker on demand so to obtain the solid/gel right before the fluid entering the loss zone; in hydraulic fracturing, the product can be used to deliver crosslinker immediately before the fluid entering the fracture and to minimize the negative impact of tortuosity on crosslinked fluids; and alternatively, the product can be used to improve the success rates for spotting cement plugs by controlling the cement setting time precisely.

The invention claimed is:

1. A product suitable for use in an oilfield environment comprising:
   a first component in liquid state;
   a first layer surrounding said first component, wherein said first layer is made of a protective material able to protect the first component from surrounding oilfield environment;
   a first susceptor, wherein said first susceptor is able to interacts with a magnetic field to generate heat.

2. The product of claim 1, wherein the first susceptor is located within the first layer.

3. The product of claim 1, further comprising a second layer surrounding the first component and surrounded by said first layer.

4. The product of claim 1, wherein the first susceptor is an electrically non-conductive susceptor, and the product further comprises a second susceptor being an electrically conductive susceptor.

5. The product of claim 4, wherein the first susceptor comprises iron oxide particles, hexagonal ferrite particles, or magnetically soft ferrite particles.

6. The product of claim 4, wherein the second susceptor comprises elemental ferromagnetic particles or ferromagnetic alloys.

7. The product of claim 1, wherein the second susceptor comprises nickel, iron, and cobalt and combinations thereof and of their alloys.

8. The product of claim 1, wherein the first component is anyone taken in the list accelerators, retarders, dispersants, extenders, weighting agents, fluid-loss and lost-circulation additives.

9. The product of claim 1, further comprising a second component surrounded by the first layer along with the first component.

10. The product of claim 9, wherein the first component and the second component are further separated.

11. A method to treat a wellbore including a zone comprising the steps of:
    pumping a product of claim 1 into said wellbore;
    placing said product in the vicinity of said zone; and
    applying an alternating magnetic field on said product.

12. The method of claim 11, wherein the step of applying an alternating magnetic field on said product is made just before said product is placed in the vicinity of said zone.

13. The method of claim 11, wherein the step of applying an alternating magnetic field on said product is made just after said product is placed in the vicinity of said zone.

14. The method of claim 11, wherein the alternating magnetic field is applied with a first retrievable tool lowered into the wellbore.

15. The method of claim 14, wherein the alternating magnetic field is applied with a second permanent tool embedded in a casing or a tubing lowered into the wellbore.

16. The method of claim 11, further comprising the step of ceasing the step of applying an alternating magnetic field on said product when said first layer has broken.

17. The method of claim 11, wherein the alternating magnetic field is of frequency between 2 MHz and 30 MHz.

* * * * *